(12) United States Patent
Turner

(10) Patent No.: US 6,239,562 B1
(45) Date of Patent: May 29, 2001

(54) CLAW TYPE TORQUE MOTOR AND THROTTLE VALVE EMPLOYING SAME

(75) Inventor: David Turner, Bloomfield Hills, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/481,116

(22) Filed: Jan. 11, 2000

(51) Int. Cl.[7] .............................. H02K 1/14; H02K 26/00; F02D 1/00
(52) U.S. Cl. ......................... 318/139; 318/138; 318/254; 318/432; 310/254; 123/399
(58) Field of Search .................................. 318/138, 139, 318/254, 430–439; 310/49, 156, 162, 164, 218, 254, 268; 123/396–399, 361, 400; 251/129.11, 305, 65, 129.01, 129.04; 137/554

(56) References Cited

U.S. PATENT DOCUMENTS

| | | | |
|---|---|---|---|
| 4,274,026 | * | 6/1981 | Haydon et al. ...................... 310/254 |
| 4,570,118 | * | 2/1986 | Tomczak et al. .................... 324/208 |
| 5,609,184 | * | 3/1997 | Apel et al. ........................... 137/554 |
| 5,624,100 | * | 4/1997 | Bolte et al. ........................... 251/65 |
| 5,738,072 | * | 4/1998 | Bolte et al. ........................... 123/399 |
| 5,823,165 | * | 10/1998 | Sato et al. ............................ 123/399 |
| 6,009,853 | * | 1/2000 | Fujikawa et al. ..................... 123/396 |
| 6,037,730 | * | 3/2000 | Turner et al. ........................ 318/432 |
| 6,067,961 | * | 5/2000 | Kato .................................... 123/399 |
| 6,109,589 | * | 8/2000 | Ackermann ............................ 251/65 |
| 6,147,427 | * | 11/2000 | Ackermann et al. ................ 310/154 |
| B1 6,167,866 | * | 1/2001 | Jakisch et al. ....................... 123/396 |

\* cited by examiner

*Primary Examiner*—Paul Ip
(74) *Attorney, Agent, or Firm*—Roger A.J. Johnston

(57) ABSTRACT

A torque motor and engine throttle valve assembly employing same having an annular stator with a pair of semi-cylindrical shell permanent magnets disposed on the inner periphery of the stator. A pair of rotor pole segments each having an L-shaped configuration in section in the plane of symmetry have an arcuately shaped outer flange. The rotor pole segments are joined axially and oppositely disposed on the motor shaft to form an S-shape in section in the plane of symmetry. A stator coil is assembled with the pole segments on the rotor shaft, and the stator coil is attached to the stator through an open side of the S-shape. The arcuate flanges maximize the rotor material adjacent the radial flux gap between the magnets and the rotor pole segments. In the throttle valve, the rotor pole segments are mounted onto an extension of the throttle blade shaft and the stator is attached to the throttle body.

15 Claims, 2 Drawing Sheets

CLAW TYPE TORQUE MOTOR AND THROTTLE VALVE EMPLOYING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to torque motors or motors of the type wherein the shaft is rotated by an amount less than one-half revolution in either direction from a center position. Torque motors are typically employed for rotary actuation of a device to be electrically controlled, as for example a servo motor rotary valve. Torque motors capable of operating on relatively low voltage direct current power have been found particularly suitable for actuating valve applications such as the air throttle valve of an internal combustion engine and particularly throttle valves for engines in motor vehicles.

In motor vehicle air throttle applications, it is necessary that a torque motor employed for rotating the throttle shaft against the force of the throttle return spring provide substantial torque at a relatively low wattage in view of the low voltage available on board typically twelve to twenty-four volts DC. Furthermore it is desired that the mass and volume of the torque motor be minimized to facilitate mounting on the air throttle body to reduce the inertial loading from vibration induced by engine operation and jounce from vehicle movement. Heretofore, known torque motors for vehicle air throttle applications have been bulky, heavy and difficult to assemble and mount on the air throttle and thus relatively costly in high volume mass production of vehicle engines.

Accordingly, it has been desired to provide a relatively low wattage torque motor operating from a low voltage direct current supply such as encountered on board a motor vehicle and one which has a relatively low mass and reduced volume with a relatively high torque output for the power available for the motor.

BRIEF SUMMARY OF THE INVENTION

The present invention provides a torque motor and throttle assembly combination having an annular stator with permanent magnets disposed on the inner periphery thereof. The shaft has rotor iron configured in a generally S-shaped configuration in an axis of symmetry taken through the rotor shaft and which has the stator coil nested therein. The generally S-shaped rotor iron is formed in two pole segments joined axially and thus enabling assembly of the S-shape over the stator coil. A torque motor of the present invention thus maximizes the amount of flux collecting iron in the stator and rotor and maximizes the pole surfaces proximate the radial air gap between the rotor and stator and thus provides optimal torque for given ampere turns of the stator coil.

The rotor having an S-shaped configuration in transverse section at the plane of symmetry is formed by two generally L-shaped segments joined axially with each segment having an arcuately shaped flange portion with the flanges oppositely disposed for maximizing the amount of flux collecting rotor material disposed adjacent the radial air gap formed between the rotor outer periphery and the inner periphery of the semi-cylindrical stator magnets. The arrangement of the arcuate flanges of the rotor thus maximizes the amount of magnetic flux flowing between the rotor and the stator magnets for a given ampere turn excitation of the stator coil.

DETAILED DESCRIPTION OF THE INVENTION

Figure 1:
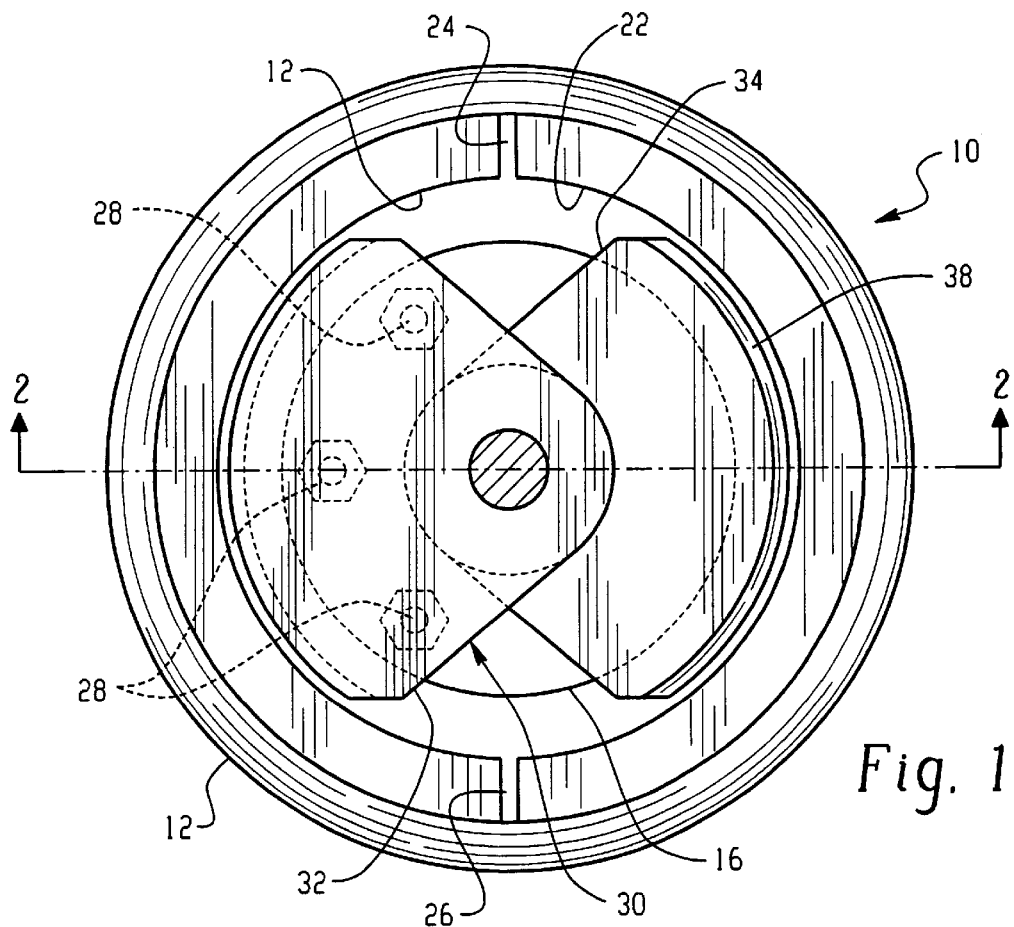
FIG. 1 is an end view of the servo motor of the present invention.
Figure 2:
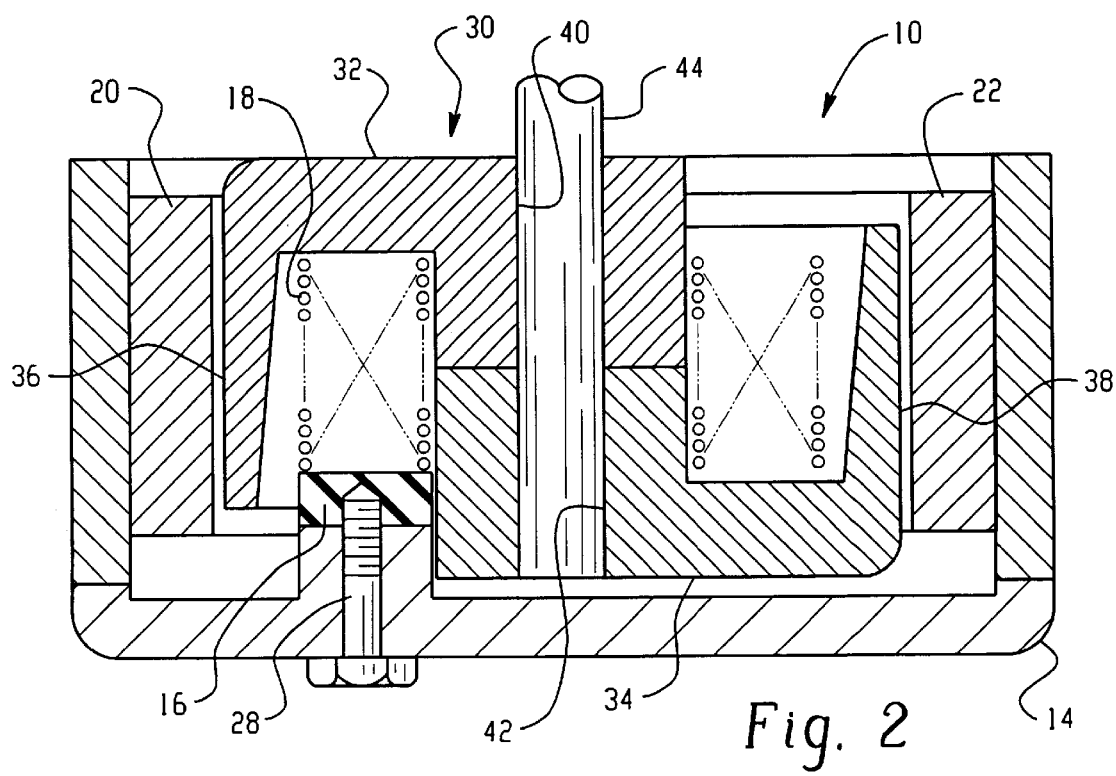
FIG. 2 is a section view taken along section indicating lines 2—2 of FIG. 1.

Referring to FIGS. 1 and 2, the torque motor of the present invention is indicated generally at 10 and includes an annular stator ring 12 formed of material of relatively high magnetic permeability and attached to a non-magnetic cap member 14 which has attached thereto a bobbin 16 with a stator winding coil 18 of electrically conductive material provided thereon. Stator ring 12 has a plurality of permanent magnets 20, 22 having a generally semi-cylindrical shell configuration disposed on the inner periphery thereof with air gaps provided at the ends thereof as denoted by reference numerals 24, 26.

The bobbin is retained on the cap 14 of the stator by suitable fasteners 28 such as screws threaded through apertures in the cap 14 which are disposed about an arcuate segment of the cap corresponding to an open side of the rotor as will hereinafter be described.

A rotor indicated generally at 30 is formed of material of relatively high magnetic permeability and includes two segments 32, 34 joined axially and having a generally S-shaped configuration in cross section in the plane of symmetry as shown in FIG. 2. Each of the rotor segments 32, 34 has a generally L-shaped configuration in section and an arcuately configured outer flange denoted respectfully 36, 38 which is shown in perspective in FIG. 3 for one of the rotor segments 34. The rotor segments 32, 34 each have an aperture denoted respectively 40, 42 formed therein with a common shaft 44 received therethrough with the rotor segments preferably press-fitted thereon. In the presently preferred practice, the rotor segments 32, 34 are assembled over the coil 18 and shaft 44 as a subassembly prior to attachment of the coil bobbin 16 and coil to the cap 14.

The outer periphery of the rotor segment flanges 36, 38 are disposed to form a radial air gap with the inner periphery of the magnets 20, 22; and, thus the rotor flanges provide a maximum amount of rotor material adjacent the surface of the magnets 20, 22 to provide increased flux across the air gaps and thus increased torque for given ampere turns excitation of stator coil 18.

In the present practice of the invention a motor having an outside diameter of about 86 mm and a length of about 40 mm should provide a torque of about 1.3 Newton-meters with 6.5 amperes excitation at 12 V DC utilizing a motor stator coil of about 350 turns.

Figure 3:
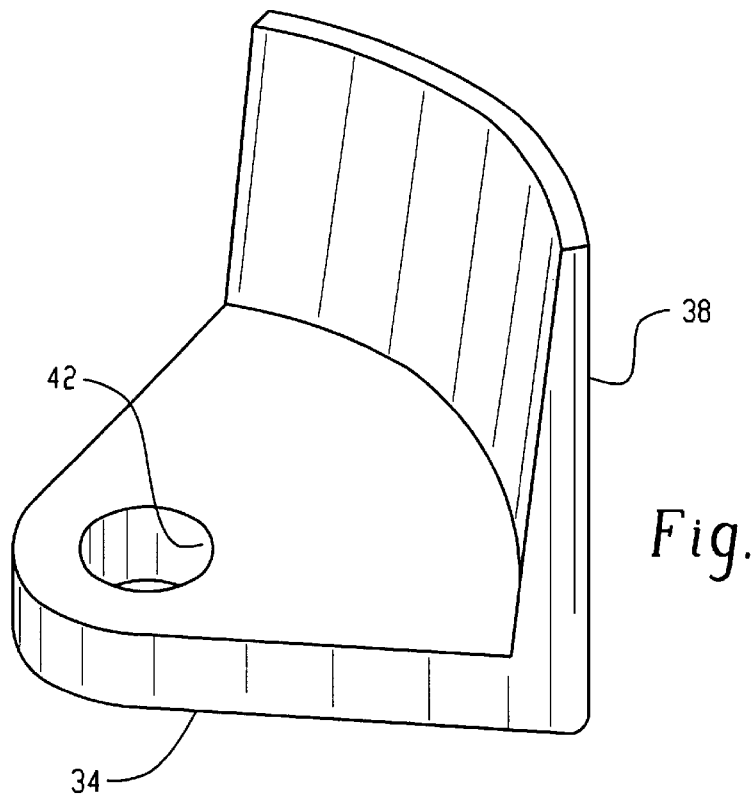
FIG. 3 is a perspective view of one of the rotor segments.

Although the invention motor illustrated in FIGS. 1–3 have two rotor pole segments 32, 34 and two stator magnets 20, 22, it will be understood that the motor may also be constructed with more than two rotor pole segments and stator magnets, such as a four pole configuration.

Figure 4:
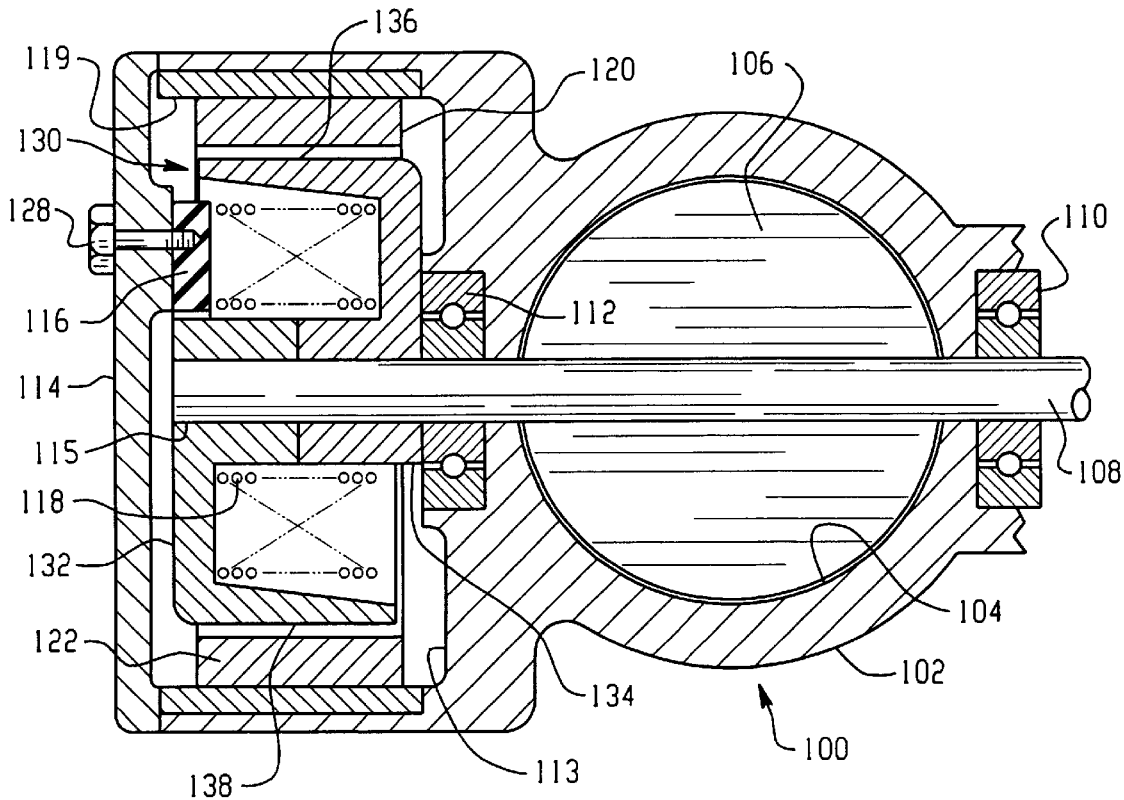
FIG. 4 is a section view taken along the throttle axis of an engine air throttle employing the motor of the present invention.

Referring to FIG. 4, another embodiment of the invention is illustrated generally at 100 and includes a motor throttle body 102 having an air inlet passage 104 with a butterfly throttle member 106 disposed therein and rotatable with a shaft 108 journalled on the throttle body in bearings 110, 112. Shaft section 115 extends into a motor chamber 113 formed in the throttle body 102. Chamber 113 is closed by a cover or cap 114 which has a motor coil 118 wound on bobbin 116 secured thereon by suitable fasteners 128. A stator ring 119 is provided in the chamber 113; and, a plurality of semi-cylindrical magnets 120, 122 are disposed on the inner periphery of the ring 119.

A rotor indicated generally at 130 comprises a pair of segments 132, 134 having arcuately shaped flanges 136, 138 in a general configuration similar to that of motor segments 36, 38 of the embodiment of FIG. 1. It will be understood that the motor of the embodiment 100 is assembled in a manner similar to that of the embodiment 10 of FIG. 1. Upon excitation of coil 118, rotor 130 is operative to rotate member 106 in accordance with the current flowing in coil 118.

The present invention thus provides a torque motor and throttle employing same having an annular stator with a pair of semi-cylindrical permanent magnets disposed on the inner periphery thereof. The stator ring is closed by a cap which has a coil secured thereto. A rotor of magnetically permeable material is formed in two axially adjoining segments, each of which has a generally L-shaped configuration section view on the axis of symmetry; and, the rotor segments when joined form a rotor having an S-shaped configuration in transverse section in the plane of symmetry. The rotor segments each have an L-shaped configuration in section in the plane of symmetry and an arcuately shaped outer flange which provides a maximum amount of material at the radial air gap adjacent the permanent magnets.

The motor of the present invention is easy to assemble and provides maximum torque for given volume and mass for a given ampere turns of stator coil excitation.

Although the invention has hereinabove been described with respect to the illustrated embodiments, it will be understood that the invention is capable of modification and variation and is limited only by the following claims.

What is claimed is:

1. A torque motor for shaft rotation less than one full revolution comprising:
   (a) a base having an annular stator having a plurality of magnets disposed about the inner periphery thereof;
   (b) a coil of electrically conductive material associated with said stator, and disposed radially inwardly of said magnets; and,
   (c) a rotor journalled for rotation on said base and having a plurality of oppositely disposed generally arcuately shaped pole segments having a generally S-shaped configuration in a section plane including the axis of rotation of said rotor.

2. The torque motor defined in claim 1, wherein said rotor pole segments have an arcuate portion thereof tapered in an axial direction.

3. The torque motor defined in claim 1, therein said plurality of rotor pole segments comprises a pair, with each pole segment subtending a central arc of about 85°.

4. The torque motor defined in claim 1, wherein said plurality of magnets comprises a pair of arcuately configured magnets.

5. The torque motor defined in claim 1, wherein said rotor is formed of a pair of axially symmetric pole segments.

6. The torque motor defined in claim 1, wherein said rotor is formed of a pair of axially symmetric pole segments having a shaft received therethrough.

7. The torque motor defined in claim 1, wherein said magnets are permanent magnets formed of ceramic ferrite material.

8. The torque motor defined in claim 1, wherein said rotor comprises a pair of similar pole segments axially joined.

9. A rotor actuated throttle valve assembly comprising:
   (a) a body having an air passage therethrough with a rotatable valve element disposed in the air passage;
   (b) a shaft journalled for rotation on said body and extending transversely through said air passage and having the valve member rotatable therewith;
   (c) a rotor attached to said shaft externally of said air passage, said rotor having a plurality of arcuate pole segments with generally S-shaped configuration in a section plane including the axis of said rotor;
   (d) a generally annular stator nested over said rotor and mounted on said body, said stator having at least a pair of magnets disposed about the inner periphery of said stator; and, a coil associated with said stator, said coil nested within said rotor, wherein upon energization of said coil, said rotor is operably responsive to the magnetic flux generated therein to effect angular movement of said shaft.

10. The throttle valve assembly defined in claim 9, wherein said magnets are formed of ceramic ferrite material.

11. The throttle valve assembly defined in claim 9, wherein said rotor is formed of two similar pole segments axially joined.

12. The throttle valve assembly defined in claim 9, wherein said rotor comprises a pair of oppositely disposed arcuate pole segments.

13. The throttle valve assembly defined in claim 12, wherein said pole segments each subtend a central angle of about 85°.

14. A method of making a torque motor assembly comprising:
   (a) disposing an annular stator on a base and disposing a pair of magnets about the inner periphery of the stator;
   (b) forming a rotor having an arcuate pole segment with a generally S-shaped configuration in a section plane including the axis of rotation and nesting said rotor within said stator and generally said rotor for angular movement with respect to said stator; and,
   (c) nesting a stationary coil within said rotor.

15. The method defined in claim 14, wherein said step of forming a rotor includes forming a pair of symmetrical members axially joined.

* * * * *